(12) United States Patent
Hingne et al.

(10) Patent No.: US 12,246,781 B2
(45) Date of Patent: Mar. 11, 2025

(54) AGRICULTURAL VEHICLE

(71) Applicant: DEERE & COMPANY, Moline, IL (US)

(72) Inventors: Abhijit G. Hingne, Khamgaon (IN); Thiemo Flebbe, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 306 days.

(21) Appl. No.: 17/934,416

(22) Filed: Sep. 22, 2022

(65) Prior Publication Data
US 2023/0127043 A1 Apr. 27, 2023

(30) Foreign Application Priority Data

Oct. 22, 2021 (DE) .......................... 102021127497.4
Nov. 17, 2021 (DE) .......................... 102021129994.2

(51) Int. Cl.
*B62D 33/06* (2006.01)

(52) U.S. Cl.
CPC ..... *B62D 33/0604* (2013.01); *B62D 33/0617* (2013.01)

(58) Field of Classification Search
CPC ........................ B62D 33/0604; B62D 33/0617
See application file for complete search history.

(56) References Cited

U.S. PATENT DOCUMENTS

| | | | |
|---|---|---|---|
| 3,873,222 A * | 3/1975 | Babbit, Jr. ......... | B62D 33/0604 280/755 |
| 4,135,757 A | 1/1979 | Smith et al. | |
| 5,024,283 A | 6/1991 | Deli | |
| 6,374,935 B1 * | 4/2002 | Kirschenmann ... | B62D 33/0604 180/89.12 |
| 9,193,396 B2 * | 11/2015 | Davisdon ............. | B62D 33/067 |
| 10,647,364 B2 * | 5/2020 | Tilp .................... | B62D 33/071 |
| 11,339,553 B2 * | 5/2022 | Mulligan ................ | E02F 9/163 |
| 2011/0135434 A1 * | 6/2011 | Yoon ...................... | E02F 9/166 414/694 |
| 2011/0241379 A1 | 10/2011 | Obe et al. | |
| 2014/0292014 A1 * | 10/2014 | Christianson ...... | B62D 33/0604 296/35.3 |
| 2015/0367899 A1 * | 12/2015 | Christianson ......... | E02F 9/0833 296/190.06 |
| 2016/0059908 A1 * | 3/2016 | Roach ................ | B62D 33/0604 296/190.06 |
| 2024/0101199 A1 * | 3/2024 | Murakami ......... | B62D 33/0617 |

FOREIGN PATENT DOCUMENTS

| | | | |
|---|---|---|---|
| CN | 108974149 A | | 12/2018 |
| CN | 211417426 U | * | 9/2020 |
| KR | 20240012871 A | * | 1/2024 |

OTHER PUBLICATIONS

European Search Report issued in application No. EP22198274.7, dated Mar. 21, 2023, 08 pages.

* cited by examiner

Primary Examiner — Faye M Fleming

(57) ABSTRACT

An agricultural vehicle including a supporting structure and a coupling system connected to the supporting structure for the movable coupling of a vehicle cab to the supporting structure. The coupling system includes at least one spring-elastic bearing element. The vehicle cab releasably connects via at least one clamping element to the at least one spring-elastic bearing element. A clamping force direction of the clamping element runs transversely to a vehicle vertical axis in a transverse direction.

20 Claims, 6 Drawing Sheets

AGRICULTURAL VEHICLE

CROSS-REFERENCE TO RELATED APPLICATIONS

This application claims priority to German Patent Application No. 102021127497.4, filed on Oct. 22, 2021, and German Patent Application No. 102021129994.2, filed Nov. 17, 2021, which are hereby incorporated by reference.

FIELD OF THE DISCLOSURE

The disclosure relates to an agricultural vehicle having a supporting structure and a coupling system which is fastened to the supporting structure for the movable coupling of a vehicle cab to the supporting structure.

BACKGROUND

Such a coupling system may contain spring-elastic components. These components promote the absorption of shock-like forces transmitted from the supporting structure to the vehicle cab and as a result the improvement of the driving comfort for the driver. Such shock-like forces are produced, for example, in the case of an uneven road and in the case of different braking or accelerating maneuvers of the vehicle.

SUMMARY

It is an object of the present disclosure to simplify a coupling system between the supporting structure and the vehicle cab relative to requirements in terms of mounting technology. This object can be achieved by an agricultural vehicle having the features of one or more of the following embodiments.

According to some embodiments, an agricultural vehicle has a supporting structure (for example a chassis, frame) and a coupling system which is fastened to the supporting structure for the movable coupling of a vehicle cab to the supporting structure. The coupling system has at least one spring-elastic bearing element. The vehicle cab is releasably connected via at least one clamping element to the spring-elastic bearing element. In this case, the clamping force direction of the clamping element runs transversely to a vehicle vertical axis in a transverse direction.

By means of such a clamping force direction it is possible to perform mounting, maintenance and repair operations on the coupling system and the vehicle cab from the sides of the vehicle in a relatively simple manner. To this end, the coupling system and/or the vehicle cab are configured in a suitable manner in terms of construction technology. For example, it is possible to arrange and to handle the clamping element or the clamping elements in terms of mounting technology outside the actual vehicle cab in a manner which is simple in terms of construction technology. As a result, awkward mounting, maintenance, and repair operations inside or below the vehicle cab are no longer required or are at least significantly reduced.

The clamping force direction in the transverse direction does not necessarily mean that the clamping force direction is oriented parallel to a vehicle transverse axis. Rather, such deviations of the clamping force direction from the vehicle transverse axis, which also ensure a simple implementation of mounting, maintenance and repair operations on the coupling system and the vehicle cab from the sides of the vehicle, are also possible.

The spring-elastic bearing element can be configured from a rubber-like material with spring-elastic properties.

The bearing element can be elastically pretensioned in the mounted or installed state thereof.

The clamping element, for example, is a clamping bolt or a clamping screw with an external thread which cooperates with a clamping nut. Such clamping elements can be obtained cost-effectively and may be handled in a manner which is simple in terms of mounting technology. A mechanical connection between the bearing element and the vehicle cab which is simple in terms of mounting technology and which at the same time is reliable is promoted thereby.

For example, the vehicle cab is releasably connected at a plurality of connecting points to one respective bearing element. In some embodiments, four connecting points of the vehicle cab are provided for one respective bearing element. For example, there are two connecting points of the vehicle cab on the front side and two on the rear side. For each connecting point, for example, one or more specific cab portions, which are releasably connected to the bearing element, are provided on the vehicle cab. In this case, the respective cab portion is penetrated, for example, by a mounting hole for the clamping element. The cab portion is configured, for example, as a portion protruding from the cab floor (for example a crossbeam, strut, or the like).

The at least one bearing element may be complemented by further components, such as for example shock absorbers, stabilizers, and specific connecting elements. These components may be a constituent part of a suspension system for the suspension of the vehicle cab relative to the supporting structure.

The agricultural vehicle can be configured as a tractor or towing vehicle or as a harvesting machine.

Further embodiments of the vehicle according to the disclosure include the following.

In some embodiments, the clamping force direction or the transverse direction runs parallel to a vehicle transverse axis. Thus, the clamping force direction also runs substantially parallel to the wheel axles of the vehicle. Such a clamping force direction promotes the simple dismantling and remounting of individual parts of the coupling system and the vehicle cab in the case of repairs or maintenance operations.

In some embodiments, the bearing element is penetrated by a through-hole for receiving the clamping element. This promotes a coupling of the vehicle cab to the supporting structure in a manner which is simple in terms of mounting technology.

In some embodiments, the bearing element has a cylindrical external cross section, whereby an efficient spring-elastic coupling which is uniform in different radial directions is implemented between the vehicle cab and the supporting structure.

In some embodiments, the through-hole is arranged coaxially to the cylindrical external cross section. By means of these geometric features, the bearing element may be configured, for example, as a hollow-cylindrical rubber bearing.

In some embodiments, the coupling system has a connecting bracket which is fastened to the supporting structure and which bears a bearing device for bearing the bearing element. This promotes a mechanically stable positioning of the bearing element inside the coupling system and thus also a stable coupling of the vehicle cab. For example, the bearing element is mounted in a manner which is elastically pretensioned.

The fastening of the connecting bracket to the supporting structure may be configured to be releasable (for example a screw connection) or unreleasable (for example a welded connection). Irrespective of its releasable or unreleasable fastening, the connecting bracket is, for example, immovably or rigidly connected to the supporting structure.

In some embodiments, the bearing device has a bearing frame which is open in the transverse direction for receiving the bearing element. This promotes a handling of the coupling system in a manner which is simple in terms of mounting technology from one or both sides of the vehicle. The bearing frame can have an annular cross section and as a result provides a hollow-cylindrical receiving space, which is simple in terms of mounting, for a bearing element with a cylindrical cross section.

In some embodiments, the bearing element is located in the bearing frame together with an intermediate frame surrounding the bearing element. In this case, the intermediate frame may serve as a mounting aid in order to position the bearing element in a manner which is simple in terms of mounting technology and at the same time with a high degree of accuracy inside the bearing frame.

In some embodiments, the bearing frame has a lateral surface with a conical internal cross section which corresponds to a conical external cross section of a lateral surface of the intermediate frame. This cooperation of the bearing frame and the intermediate frame by adapting the geometry thereof to one another permits a guided movement of the bearing element, which is simple in terms of mounting, during the installation thereof in the bearing frame and facilitates a mechanically stable seat between the bearing element and the bearing frame.

An accurate installation of the intermediate frame in the bearing frame can be promoted by the conical lateral surface of the intermediate frame having flexible properties, for example by means of cut-outs in the lateral surface. As a result, the intermediate frame may be moved (together with the spring-elastic bearing element) with a low mounting force sufficiently far into the bearing frame until the bearing frame, on the one hand, and the intermediate frame with the bearing element, on the other hand, are connected together in the manner of a press fit. This additionally promotes a mechanically stable seat of the bearing element.

As already mentioned, the cross section of the bearing frame or the lateral surface thereof, for example, is of annular configuration. Accordingly, therefore, the cross section of the intermediate frame or the lateral surface thereof is also of annular configuration for receiving a cylindrical bearing element. In the case of these annular cross sections, the lateral surface of the bearing frame is configured in the manner of a frustum of a cone which cooperates with a similarly frustoconical lateral surface of the intermediate frame.

In some embodiments, the bearing device is configured such that it has two bearing jaws which are releasably connected together. In this embodiment, it is possible to insert the bearing element initially into a first bearing jaw and then to brace the second bearing jaw relative to the first bearing jaw (for example by means of a screw connection). The bearing element is thus automatically clamped between the two bearing jaws which act as clamping jaws. This permits a simple mounting and a mechanically stable installed position of the bearing element, even without the use of the additional intermediate frame.

In some embodiments, a first bearing jaw bears a fixing pin which is oriented in the direction of the second bearing jaw and which engages in a corresponding fixing recess of the bearing element. For example, the fixing pin engages approximately positively in the fixing recess.

The fixing pin serves as a positioning and mounting aid during the insertion of the bearing element into the first bearing jaw. During the operation of the bearing element, i.e., after the mounting of the second bearing jaw, the fixing pin counteracts undesired positional changes (for example in an axial and/or radial direction) of the bearing element.

The connecting bracket can be configured in terms of construction technology such that it has two bearing portions, with in each case a bearing device. In this case, the two bearing portions are arranged spaced apart from one another in the transverse direction. Thus, a single connecting bracket with few components may already provide two bearing points for the vehicle cab which are spaced apart from one another in the transverse direction. For example, in this case there are two bearing points of the vehicle cab on the front side relative to the vehicle. Alternatively, or additionally, two bearing points of the vehicle cab on the rear side may also be combined with such a connecting bracket. The mounting effort for a mechanically stable bearing or coupling of the vehicle cab to the supporting structure is further reduced by using one connecting bracket or a plurality of such connecting brackets.

The connecting bracket and the bearing devices can be produced from metal materials.

For example, at least individual constituent parts thereof (for example the bearing frame, intermediate frame, bearing jaws) may be produced as cast parts. The bearing devices may be produced completely separately or at least as a partially integral constituent part of the connecting bracket. In the case of a completely separate production, the bearing devices can have suitable bearing portions for a rigid connection to the connecting bracket (for example by means of welding).

The above and other features will become apparent from the following detailed description and accompanying drawings.

BRIEF DESCRIPTION OF THE DRAWINGS

The agricultural vehicle according to the disclosure is described in more detail hereinafter with reference to the accompanying drawings. In this case, components which coincide or which are comparable regarding their function are identified by the same reference numerals. In the drawings.

DETAILED DESCRIPTION

The embodiments or implementations disclosed in the above drawings and the following detailed description are not intended to be exhaustive or to limit the present disclosure to these embodiments or implementations.

Figure 1:
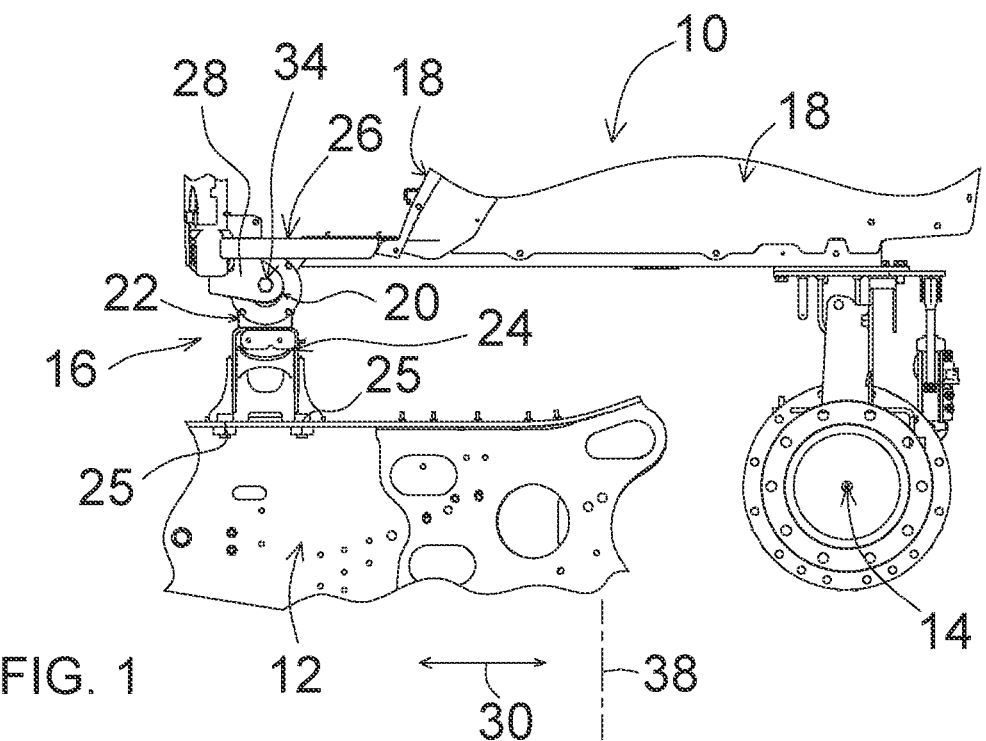
FIG. 1 shows a side view of a detail of the agricultural vehicle according to the disclosure in the region of the vehicle cab.

FIG. 1 shows a detail of an agricultural vehicle 10 in the form of a tractor with a supporting structure 12 and a rear axle 14. A coupling system 16 is fastened to the supporting structure 12. The coupling system serves for a movable coupling of a vehicle cab 18 to the supporting structure 12.

The coupling system 16 may contain different (for example mechanical and/or hydraulic) components for a coupling or suspension of the vehicle cab 18 onto the supporting structure 12. According to the disclosure, in the following description a spring-elastic (for example rubber-like) bearing element 20, a bearing device 22 and a connecting bracket 24 are important as constituent parts of the coupling system 16.

The connecting bracket 24 is fixedly or rigidly connected to the supporting structure 12, for example by means of a screw connection. To this end, the connecting bracket is penetrated by screw holes 25.

Figure 2:
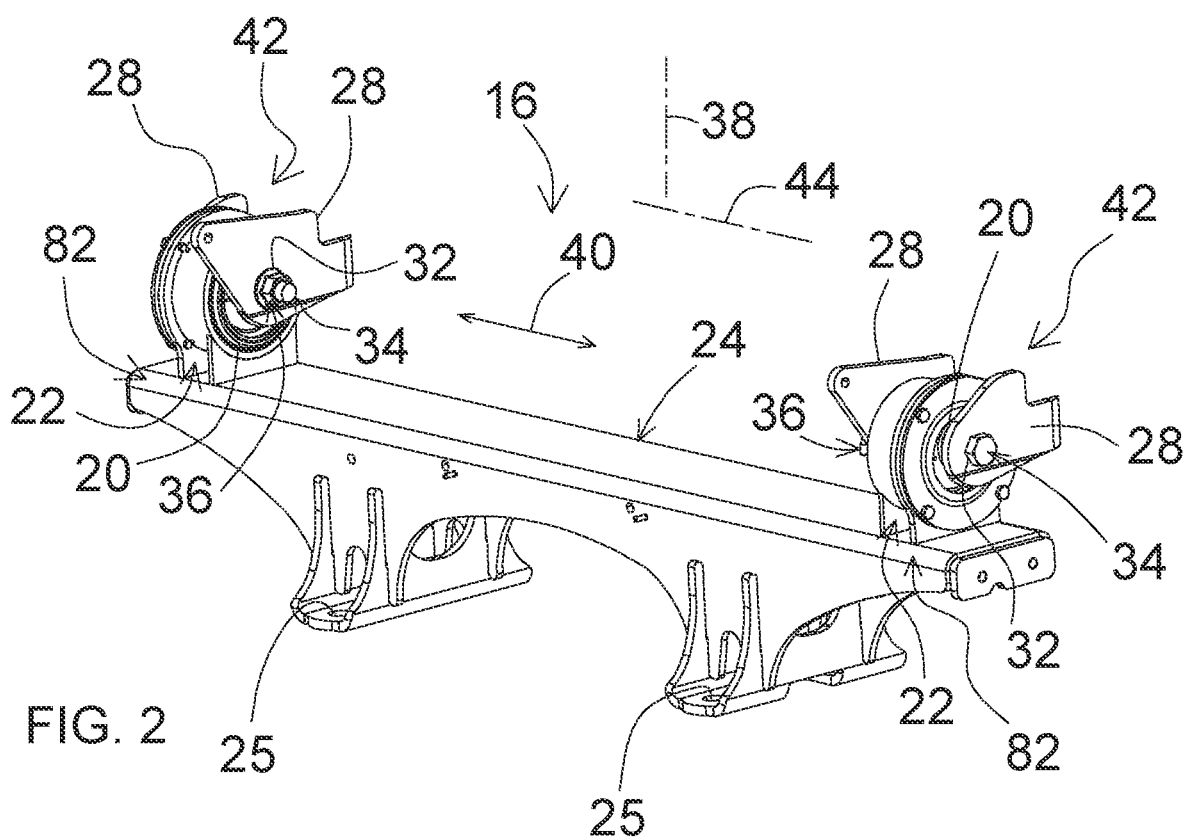
FIG. 2 shows a perspective view of a connecting bracket with two bearing devices for one respective bearing element.

In a cab region 26 on the ground side the vehicle cab 18 has a plurality of connecting braces 28 which are assigned in each case in pairs to a spring-elastic bearing element 20 (FIG. 2). These connecting braces 28 are arranged in a region of the vehicle cab 18 on the front side, in front of the rear axle 14 in a vehicle longitudinal direction 30.

The connecting braces 28 each include a mounting hole 32 for a clamping element 34 in the form of a clamping screw. The clamping element 34 has an external thread which cooperates with a clamping nut 36 having a corresponding internal thread. In the mounted state shown in FIG. 2, transversely to a vertical vehicle axis 38 the clamping element 34 penetrates two connecting braces 28 and the bearing element 20 arranged therebetween. As a result, the two connecting braces 28 and the assigned bearing element 20 are releasably clamped together in a transverse direction 40. Thus, the vehicle cab 18 is releasably connected via the clamping element 34 to the bearing element 20.

It may be derived from FIG. 2 that two connecting points 42 which are spaced apart from one another in the transverse direction 40 are provided in the cab region 26 of the vehicle cab 18, on the front side and ground side, for coupling the vehicle cab 18 to the supporting structure 12. The transverse direction 40 in turn runs parallel to a horizontal vehicle transverse axis 44.

The construction of the bearing device 22 according to FIG. 2 can be identified more clearly in FIG. 3a to FIG. 6. The bearing device 22 has a bearing frame 46 which is open in the transverse direction 40. The bearing frame has an annular cross section but tapers in a conical or frustoconical manner starting from a mounting inlet 48 in the transverse direction 40.

Figure 3A:
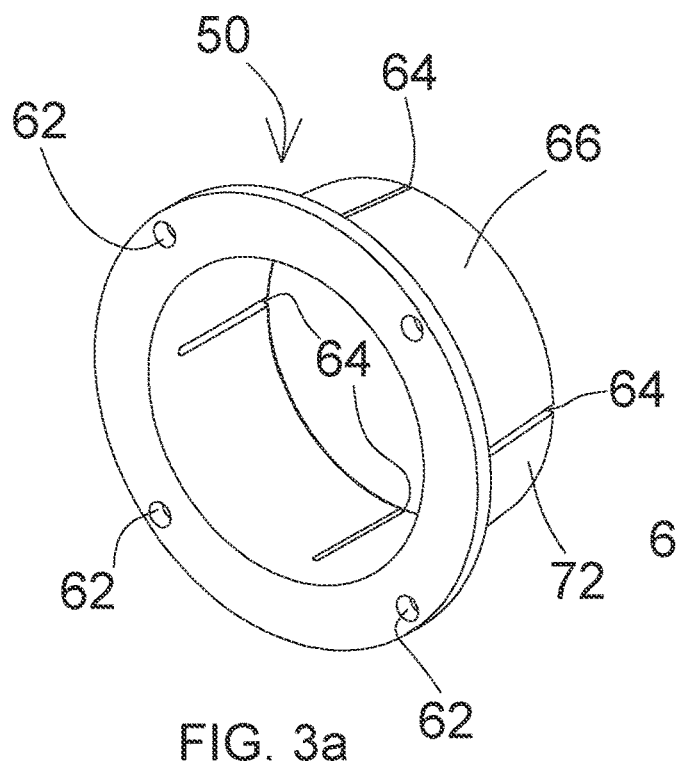
FIG. 3a shows a perspective view of a component of a bearing device for receiving a bearing element.
Figure 3B:
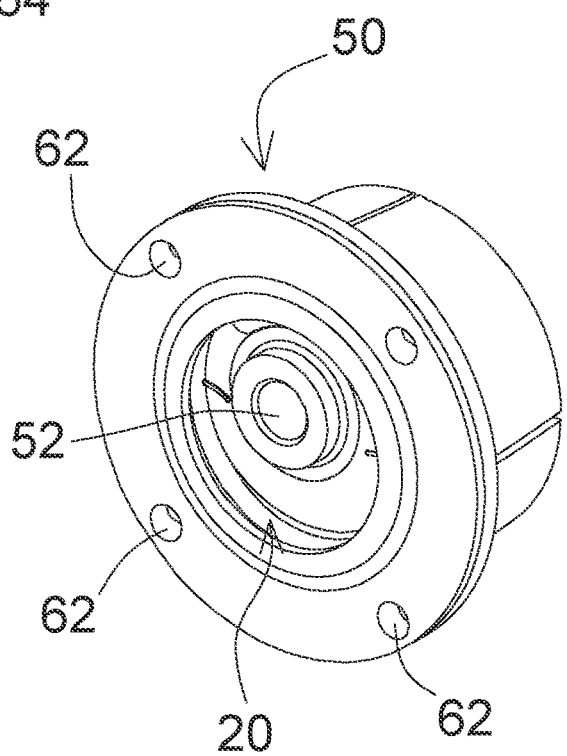
FIG. 3b shows a perspective view of the component according to FIG. 3a with the received bearing element.
Figure 3C:
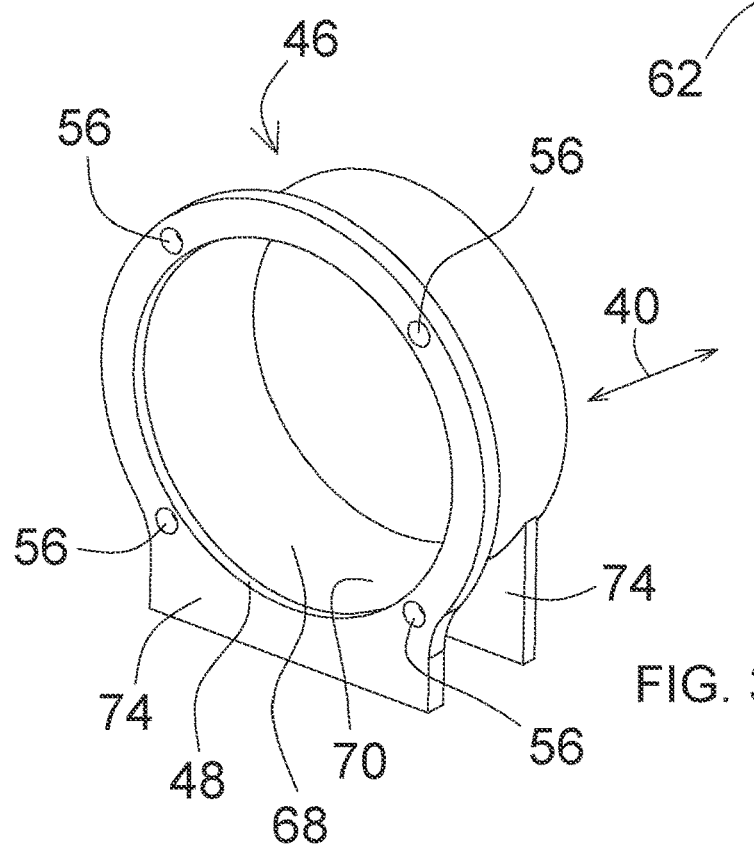
FIG. 3c shows a perspective view of a further component of a bearing device for bearing the bearing element.
Figure 4:
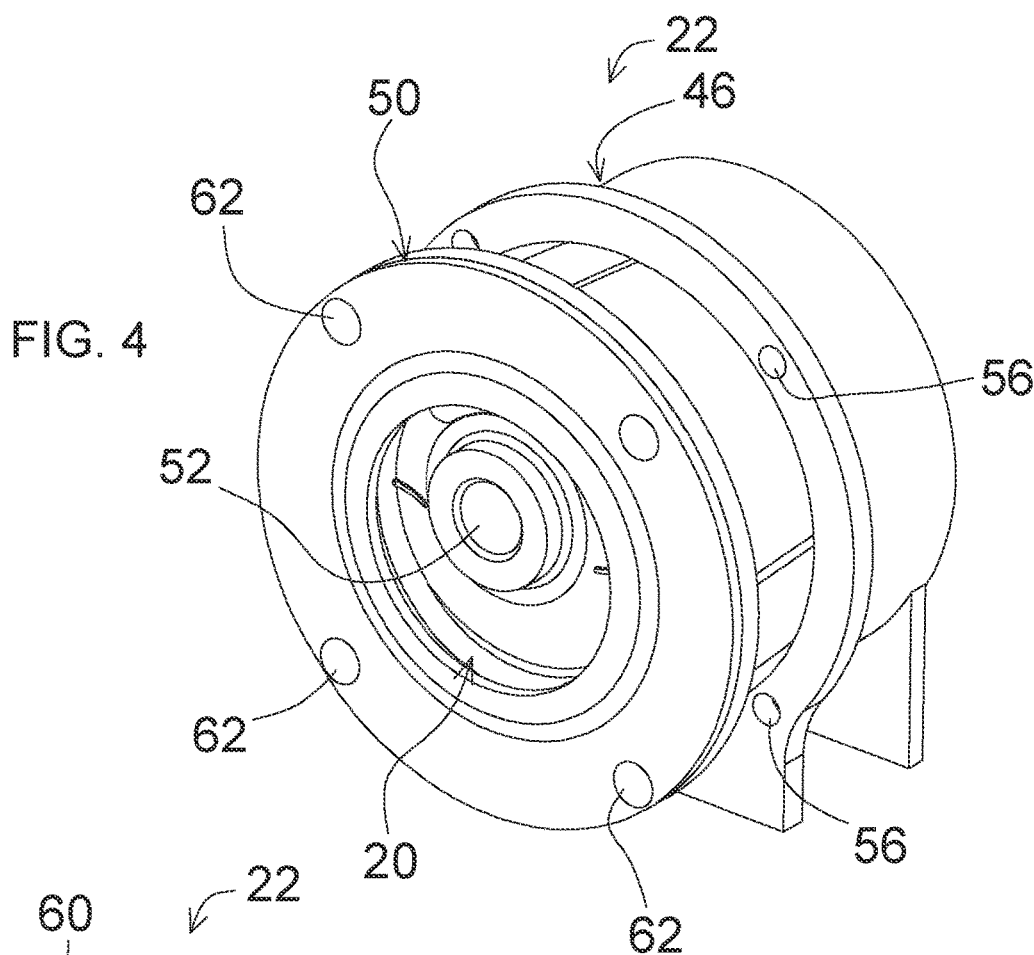
FIG. 4 shows a perspective view of the components according to FIG. 3a to FIG. 3c during the assembly thereof.

A sleeve-like intermediate frame 50, which is also annular in cross section, initially receives the substantially cylindrical bearing element 20 (FIG. 3a, FIG. 3b). It is also derived from FIG. 3b that the bearing element 20 is penetrated by an axial through-hole 52 for receiving the clamping element 34. The intermediate frame 50 is inserted together with the bearing element 20 in the mounting inlet 48 of the bearing frame 46 and then moved axially or in the transverse direction 40 further into the bearing frame 46 (FIG. 4).

Figure 5:
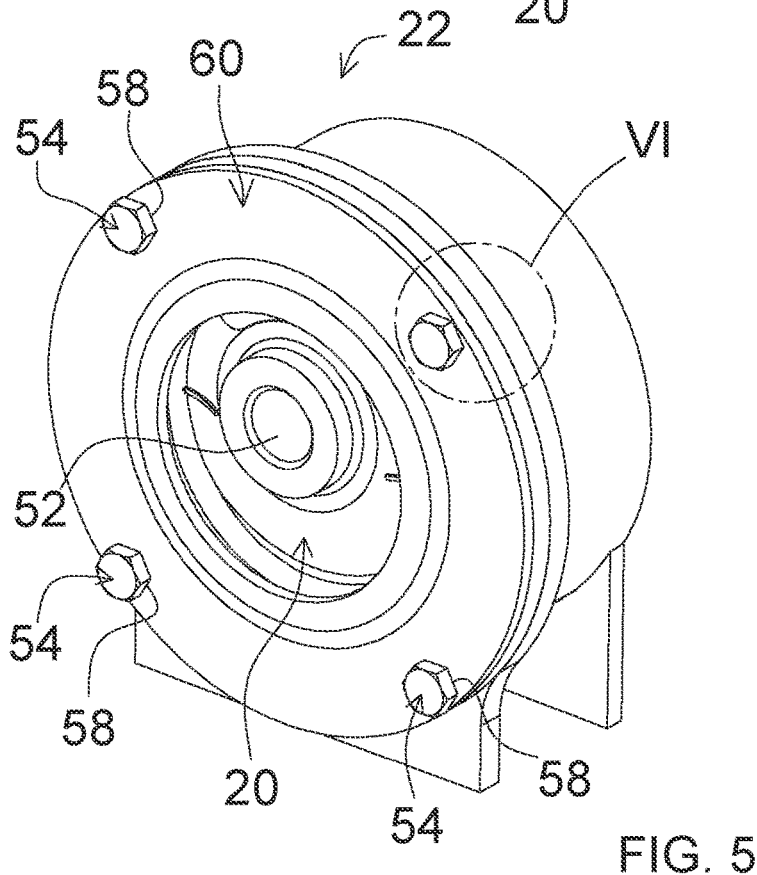
FIG. 5 shows a perspective view of the components according to FIG. 4 after the assembly thereof.

An accurate seat of the intermediate frame 50 and the bearing element 20 inside the bearing frame 46 is automatically achieved with low mounting effort and low force expenditure by a plurality of bearing screws 54 being used (FIG. 5). The external threads thereof cooperate in each case with an internal thread 56 on the bearing frame 46. During the mounting, the bearing screws 54 initially penetrate plate holes 58 of an annular cover plate 60 and then the intermediate holes 62 of the intermediate frame 50. Then the external threads of the bearing screws 54 engage in the internal threads 56 of the bearing frame 46. When the bearing screws 54 are screwed in further, the intermediate frame 50 and the bearing element 20 are automatically and accurately pulled into the bearing frame 46. For achieving this accurate bearing (for example in the manner of a press fit) of the bearing element 20 inside the bearing device 46, the spring-elastic properties of the bearing element 20 can be beneficial, as are a plurality of sleeve portions 64 on an intermediate lateral surface 66 of the intermediate frame 50.

Figure 6:
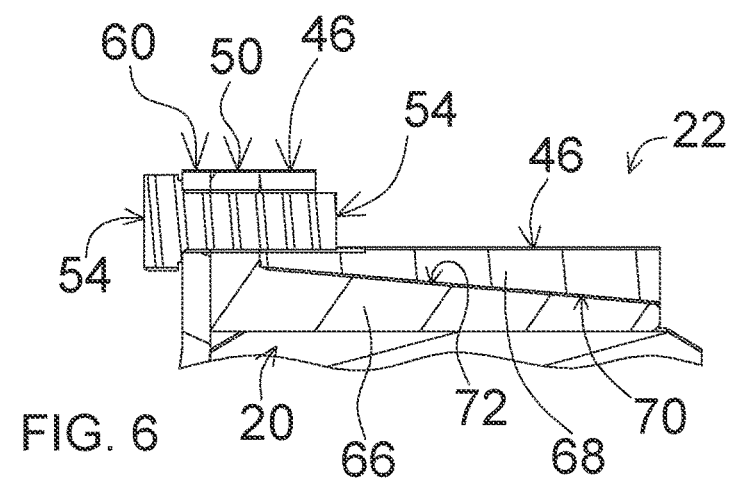
FIG. 6 shows an enlarged and partial sectional side view of the detail VI in FIG. 5.

Moreover, an installation of the bearing element 20 in the bearing frame 46, in a manner which is simple in terms of mounting technology, is promoted by a bearing lateral surface 68 of the bearing frame 46 having a conically tapered internal cross section 70—as already mentioned—and cooperating with a conically tapered external cross section 72 of the intermediate lateral surface 66 (FIG. 6).

In the bearing device 22 according to FIG. 2 to FIG. 6 two bearing projections 74 which are spaced apart from one another in a manner which is plane-parallel, axially or in the transverse direction 40, are provided, said bearing projections being fixedly connected to the connecting bracket 24 (for example welded). The bearing projections 74 protrude radially beyond the bearing lateral surface 68 and in each case are located in a plane arranged at right-angles to the central longitudinal axis of the bearing lateral surface 68.

Figure 7:
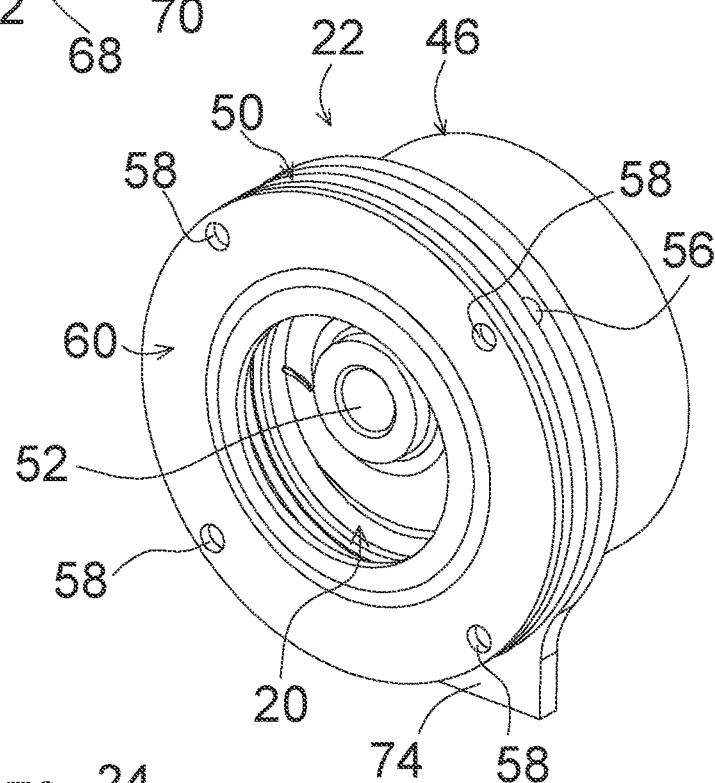
FIG. 7 shows a perspective view of a further embodiment of a bearing device for bearing the bearing element.

FIG. 7 shows a further embodiment of the bearing device 22. In this case, the bearing frame 46 does not have a bearing projection 74. Rather, a single bearing projection 74 is provided, said bearing projection protruding radially beyond the intermediate lateral surface 66 and being located in a plane arranged at a right-angles to the central longitudinal axis of the intermediate lateral surface 66. The bearing projection 74 in turn is fixedly connected to the connecting bracket 24 (for example welded). The assembly of the bearing device 22 is different from the embodiment in FIG. 3a to FIG. 6 to the extent that the bearing frame 46 is moved toward the intermediate frame 50.

Figure 8:
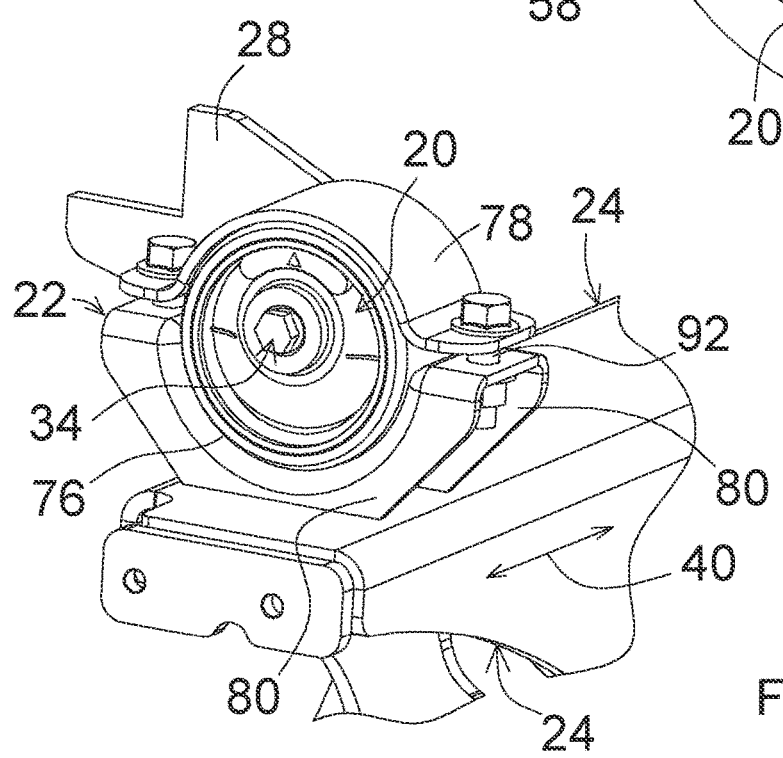
FIG. 8 shows a perspective partial view of a connecting bracket with a further embodiment of a bearing device for bearing the bearing element.

In FIG. 8 a further embodiment of the bearing device 22 is shown. The bearing device has two bearing jaws 76, 78 which are releasably connected together. The bearing jaws are screwed together and, as a result, may receive and fixedly clamp the bearing element 20 therebetween in the manner of two clamping jaws. A first bearing jaw 76 is connected to two approximately plane-parallel supporting webs 80. The supporting webs 80 in turn are fixedly connected to the connecting bracket 24 (for example welded). For example, the supporting webs 80 and the bearing jaws 76 are produced as a common integral component.

Figure 9:
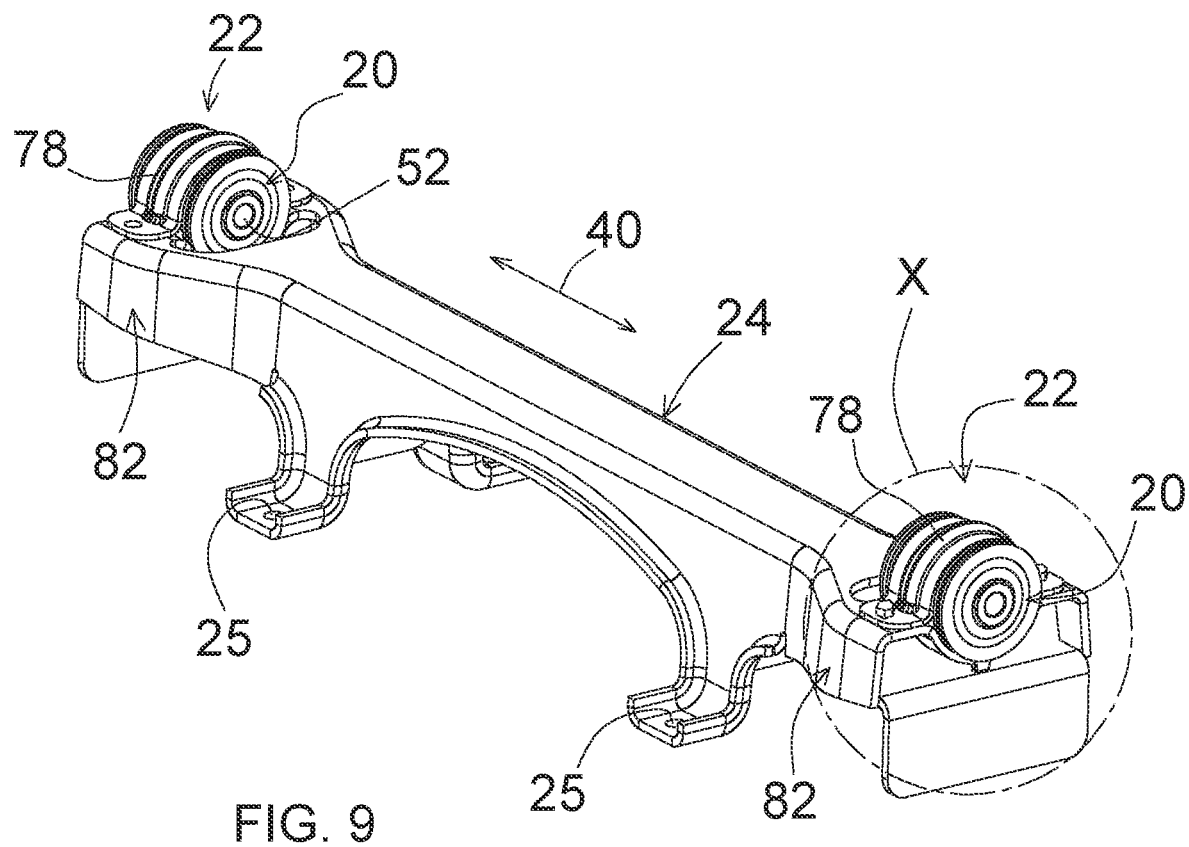
FIG. 9 shows a perspective view of a further embodiment of a connecting bracket with a further embodiment of two bearing devices.

FIG. 9 shows a connecting bracket 24, the two bearing portions 82 thereof which are spaced apart in the transverse direction 40 in each case bearing a bearing device 22 according to a further embodiment. In this embodiment, the second bearing jaw 78 is screwed to the first bearing jaw 76 with the interposition of the bearing element 20. The first bearing jaw 76 is, however, configured here as an integral constituent part of the bearing portion 82 of the connecting bracket 24 (FIG. 10).

Figure 10:
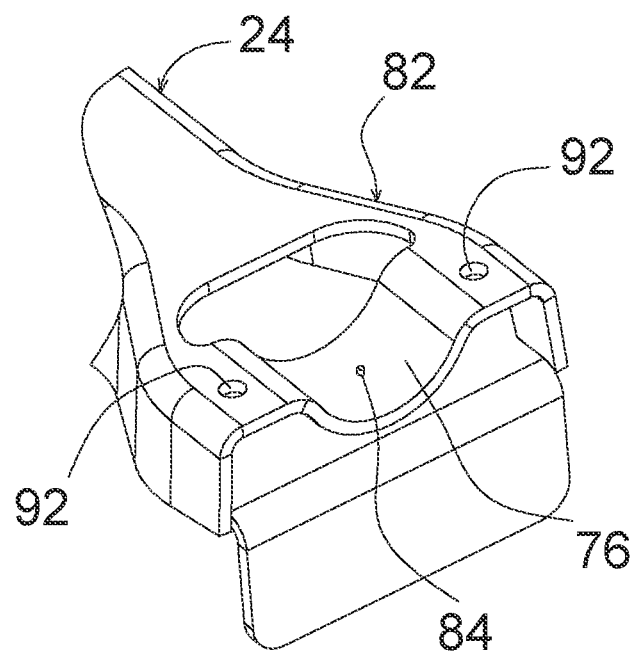
FIG. 10 shows an enlarged perspective view of the detail X in FIG. 9 but without the bearing element.
Figure 11:
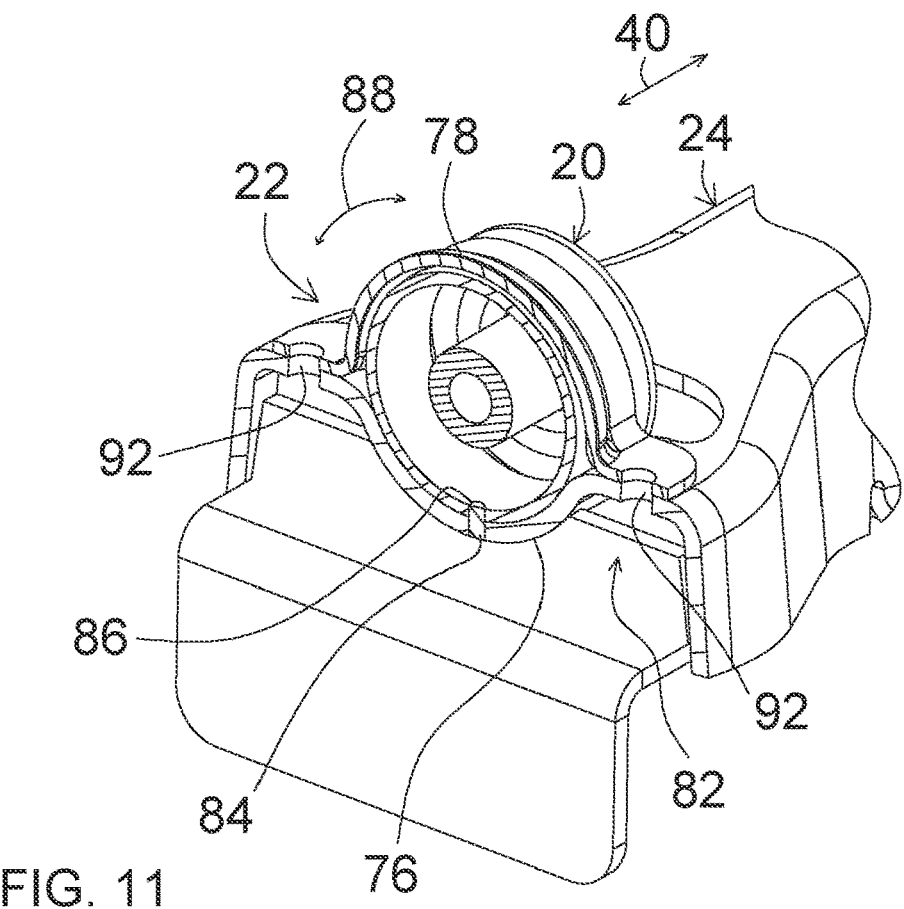
FIG. 11 shows a further perspective view, for example, of the bearing portion according to FIG. 10 but with a section through the bearing device and the bearing element.

The first bearing jaw 76 according to FIG. 10 bears a fixing pin 84 which is oriented in the direction of the second bearing jaw 78 and which engages approximately positively in a corresponding fixing recess 86 of the bearing element 20 (FIG. 11). As a result, the bearing element 20 is effectively protected from undesired positional changes both in the transverse direction 40 and in a rotational direction 88.

Figure 12:
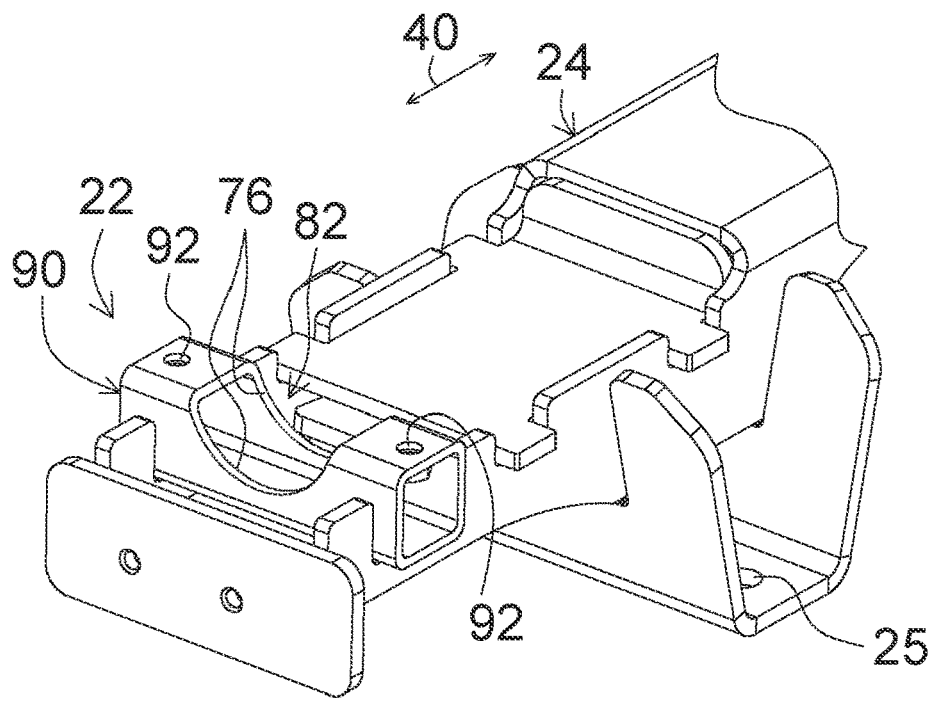
FIG. 12 shows a perspective view of a further embodiment of a connecting bracket with a further embodiment of a bearing device.

FIG. 12 shows a further embodiment of the connecting bracket 24 with two bearing portions 82, with one bearing portion 82 being visible. The first bearing jaw 76 is shown as a constituent part of the bearing device 22, said first bearing jaw being implemented in this case on a square profile 90. The square profile is fixedly connected to the bearing portion 82 (for example welded) and penetrated by two through-holes 92 which permit a screw connection, which is simple in terms of mounting, between the first bearing jaw 76 and the respective second bearing jaw 78.

Overall, the various embodiments of the bearing device 22 and the connecting bracket 24 permit a functionally reliable and efficient coupling of the vehicle cab 18 to the supporting structure 12 with low mounting effort, low mounting forces and without the use of an elaborate special tool.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An agricultural vehicle, comprising:
a supporting structure; and
a coupling system connected to the supporting structure for the movable coupling of a vehicle cab to the supporting structure, the coupling system having at least one spring-elastic bearing element, the vehicle cab releasably connected via at least one clamping element to the at least one spring-elastic bearing element, and the clamping element having a clamping force direction running transversely to a vehicle vertical axis in a transverse direction;
wherein the coupling system includes a connecting bracket fastened to the supporting structure and supporting a bearing device which receives the at least one spring-elastic bearing element;
wherein the bearing device has a bearing frame which is open in the transverse direction for receiving the at least one spring-elastic bearing element; and
wherein the at least one spring-elastic bearing element is located in the bearing frame together with an intermediate frame surrounding the at least one spring-elastic bearing element.

2. The agricultural vehicle of claim 1, wherein the transverse direction of the clamping force runs parallel to a vehicle transverse axis.

3. The agricultural vehicle of claim 1, wherein the at least one spring-elastic bearing element includes a through-hole for receiving the clamping element.

4. The agricultural vehicle of claim 1, wherein the bearing frame has a lateral surface with a conical internal cross section which corresponds to a conical external cross section of a lateral surface of the intermediate frame.

5. The agricultural vehicle of claim 1, wherein the bearing device has two bearing jaws, which are releasably connected together and which receive the at least one spring-elastic bearing element between the two clamping jaws.

6. The agricultural vehicle of claim 5, wherein a first bearing jaw bears a fixing pin which is oriented in the direction of the second bearing jaw and which engages in a corresponding fixing recess of the at least one spring-elastic bearing element.

7. The agricultural vehicle of claim 1, wherein the connecting bracket has two bearing portions spaced apart from one another in the transverse direction.

8. The agricultural vehicle of claim 1, wherein the at least one spring-elastic bearing element has a cylindrical external cross section.

9. An agricultural vehicle, comprising:
a supporting structure; and a coupling system connected to the supporting structure for the movable coupling of a vehicle cab to the supporting structure, the coupling system having at least one spring-elastic bearing element, the vehicle cab releasably connected via at least one clamping element to the at least one spring-elastic bearing element, and the clamping element having a clamping force direction running transversely to a vehicle vertical axis in a transverse direction;

wherein the coupling system includes a connecting bracket fastened to the supporting structure and supporting a bearing device which receives the at least one spring-elastic bearing element;

wherein the bearing device has two bearing jaws, which are releasably connected together and which receive the at least one spring-elastic bearing element between the two clamping jaws; and wherein a first bearing jaw bears a fixing pin which is oriented in the direction of the second bearing jaw and which engages in a corresponding fixing recess of the at least one spring-elastic bearing element.

10. The agricultural vehicle of claim 9, wherein the at least one spring-elastic bearing element includes a through-hole for receiving the clamping element.

11. The agricultural vehicle of claim 9, wherein the bearing device has a bearing frame which is open in the transverse direction for receiving the at least one spring-elastic bearing element.

12. The agricultural vehicle of claim 9, wherein the at least one spring-elastic bearing element has a cylindrical external cross section.

13. An agricultural vehicle, comprising:
a supporting structure; and
a coupling system connected to the supporting structure for the movable coupling of a vehicle cab to the supporting structure, the coupling system having at least one spring-elastic bearing element, the vehicle cab releasably connected via at least one clamping element to the at least one spring-elastic bearing element, and the clamping element having a clamping force direction running transversely to a vehicle vertical axis in a transverse direction;

wherein the coupling system includes a connecting bracket fastened to the supporting structure and supporting a bearing device which receives the at least one spring-elastic bearing element; and wherein the connecting bracket has two bearing portions spaced apart from one another in the transverse direction.

14. The agricultural vehicle of claim 13, wherein the transverse direction of the clamping force runs parallel to a vehicle transverse axis.

15. The agricultural vehicle of claim 13, wherein the at least one spring-elastic bearing element includes a through-hole for receiving the clamping element.

16. The agricultural vehicle of claim 13, wherein the bearing device has a bearing frame which is open in the transverse direction for receiving the at least one spring-elastic bearing element.

17. The agricultural vehicle of claim 16, wherein the at least one spring-elastic bearing element is located in the bearing frame together with an intermediate frame surrounding the at least one spring-elastic bearing element.

18. The agricultural vehicle of claim 17, wherein the bearing frame has a lateral surface with a conical internal cross section which corresponds to a conical external cross section of a lateral surface of the intermediate frame.

19. The agricultural vehicle of claim 13, wherein the bearing device has two bearing jaws, which are releasably connected together and which receive the at least one spring-elastic bearing element between the two clamping jaws.

20. The agricultural vehicle of claim 19, wherein a first bearing jaw bears a fixing pin which is oriented in the direction of the second bearing jaw and which engages in a corresponding fixing recess of the at least one spring-elastic bearing element.

* * * * *